PROTECTIVELY COVERED HYBRID MICROCIRCUITS

Filed Nov. 8, 1967

INVENTOR.
Johan Lund

BY

E. J. Wallace
ATTORNEY

United States Patent Office 3,469,148
Patented Sept. 23, 1969

3,469,148

PROTECTIVELY COVERED HYBRID MICROCIRCUITS

Johan Lund, Mountain View, Calif., assignor to General Motors Corporation, Detroit, Mich., a corporation of Delaware Filed Nov. 8, 1967, Ser. No. 681,332
Int. Cl. H01l *19/00;* H02b *1/02*
U.S. Cl. 317—101 6 Claims

ABSTRACT OF THE DISCLOSURE

A miniature hybrid integrated circuit assembly in which a semiconductive element is attached to a circuit board and wire bonded into the circuit on the board, with the resultant assembly encapsulated in plastic. Means is provided to isolate the enclosing plastic material from the filamentary wire bonds interconnecting the semiconductive elements and the electrical circuit.

Background of the invention

This invention relates to a plastic encapsulated hybrid integrated microcircuit assembly which includes a semiconductive element attached to the circuit board wire bonded into the circuit.

Typically, such an assembly is provided with an enveloping plastic coating that both seals and protects the assembly. The coating is thick enough to cover the semiconductive elements and the interconnecting wire filaments attached to the elements. The plastic coating is easy to apply and protects the wire filaments from mechanical damage due to handling of the finished circuit.

However, I have found that over extended periods of use, such microcircuit assemblies degenerate. I have found that over extended thermal cycling, the wires or the wire bonds break within the enclosing protective plastic coating. It appears that the difference in thermal expansion characteristics between the resin and the circuit board induces sufficient stress to the filamentary interconnecting wire and its bonds to eventually either break the wire or separate it from the surface to which it is bonded. In either event, degeneration of the circuit assembly results.

Summary of the invention

It is, therefore, a principal object of this invention to provide a means for isolating the filamentary interconnecting terminal wires in hybrid integrated circuits from the plastic material used to encapsulate such circuits.

More specifically, this invention provides a protective covering for the wire bonds in hybrid integrated circuits, which covering is applied before the surface of the circuit is encapsulated in plastic to prevent any contact between the plastic encapsulation and the filamentary interconnecting wires used to interconnect the semiconductor elements on the circuit board.

Brief description of the drawing

Other objects, features and advantages of this invention will become apparent from the following detailed description of preferred embodiments thereof and from the drawing, in which.

Description of the preferred embodiments

Figure 1:
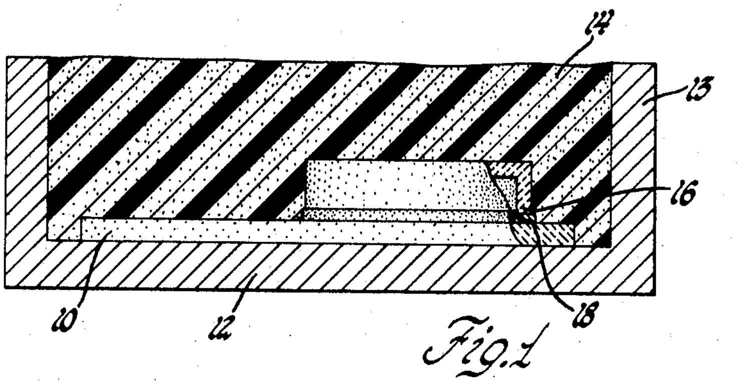
FIGURE 1 is a sectional view in partial elevation of a plastic coated hybrid microcircuit assembly made in accordance with the invention.
Figure 2:
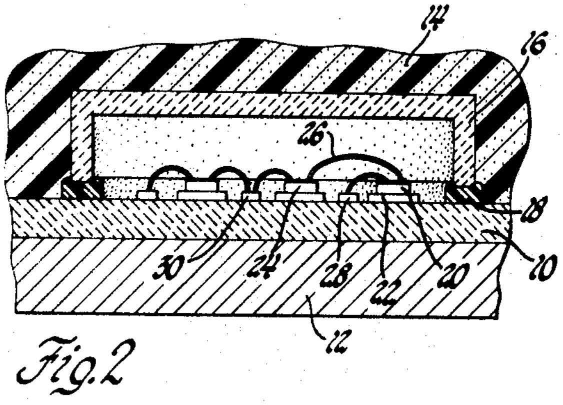
FIGURE 2 is a fragmentary sectional view of a portion of the circuit assembly shown in FIGURE 1.

As can be seen in connection with FIGURES 1 and 2 the invention involves a circuit board 10 of ceramic or the like which is soldered to a metal support member 12 having upstanding side walls 13 which form a damming around the circuit board to retain a liquid plastic 14 which is cast in place over the circuit board. A ceramic cover 16 is bonded to the circuit board 10 by means of an adhesive 18 to isolate that portion of the circuit board 10 enclosed within cover 16. In this manner the plastic potting 14 does not contact the surface portion of the circuit board with cover 16.

As can be seen more clearly in connection with FIGURE 2, the area of the circuit board isolated from contact with the plastic potting 14 includes a semiconductive element 20 which is soldered to a circuit pattern segment 22. Semiconductive element 20 is electrically connected to another semiconductive element 24 by means of a filamentary interconnecting terminal wire 26. Semiconductive elements 20 and 24 are also connected by similar wire bonds to selected portions 28 and 30, respectively, of a circuit pattern on the circuit board.

The semiconductive elements 20 and 24 may, for example, be a planar transistor or diode. However, in addition, they may be other types of semiconductive elements, such as a monolithic semiconductor chip containing a multiplicity of discrete active devices which are interconnected with one another on the chip itself. The wire bonding can be achieved by any of the known and accepted ways as, for example, thermocompression wedge bonding and ball bonding, or ultrasonic bonding. The wire used in such bonding is generally of gold or aluminum and is of a diameter of about 2 to 10 mils, while occasionally larger diameter wires up to 25 mils are used.

Figure 3:
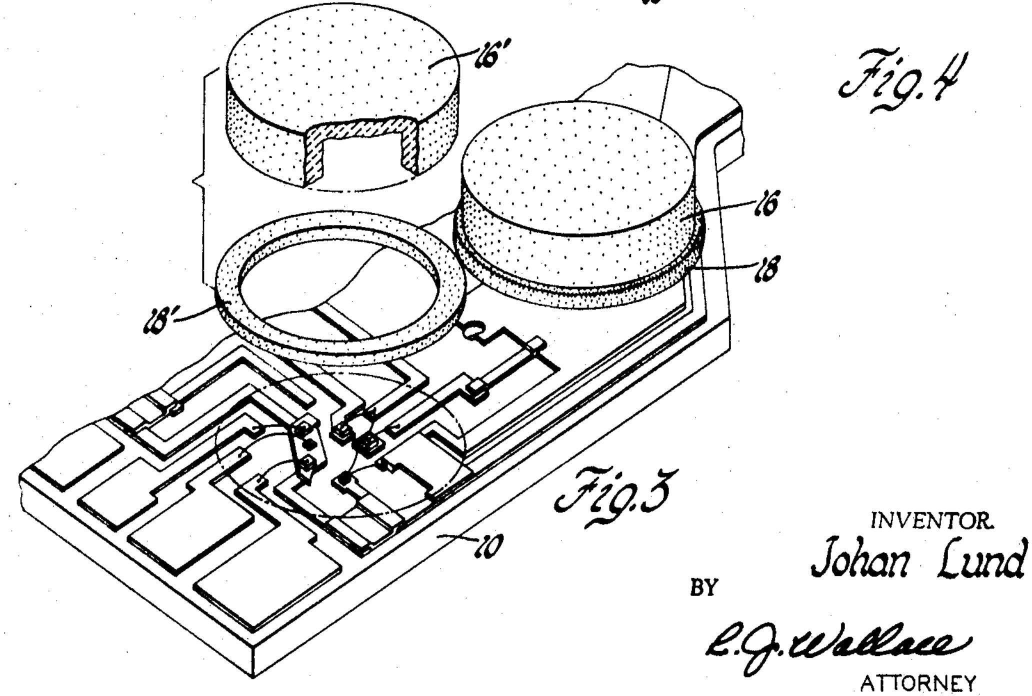
FIGURE 3 shows an exploded elevational view in perspective of a circuit board made in accordance with the invention.

In FIGURE 3, a cap 16 is shown mounted on a circuit board 10 by means of a bonding medium 18. The cap member is preferably of a material having a coefficient of thermal expansion close to that of the circuit board. Hence, if the circuit board is principally of alumina, I prefer that the cap also be made of alumina. However, matching of thermal expansion characteristics may not be necessary in some cases. If so, a plastic cap might be used instead of a ceramic one. The bonding material 18 is an annulus of a low melting glass or of an organic adhesive. While the nature of the bonding material is not especially important, it should not be conductive since it will overlap a plurality of conductors and nonconductors on the circuit pattern. This latter aspect of the invention can be seen better in connection with the exploded view of the second cap 16′ and annulus 18′ of bonding material shown in FIGURE 3. As can be seen, the cover 16′ and annulus 18′ of bonding material overlap a plurality of conductors and isolate a multiplicity of semiconductive elements which are interconnected by wire bonds to various portions of the electrical circuit. One can use a separate cover for each semiconductive element and its associated terminal wires. On the other hand, one can group the elements and associated wires under a single cover, or divide them into sub-groups, each group of which is protected by a single cover.

Figure 4:
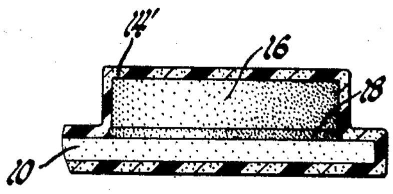
FIGURE 4 shows a fragmentary sectional view in partial elevation of a circuit board such as shown in FIGURE 3 after the circuit board has been potted in plastic.

FIGURE 4 shows a circuit board 10 with my protective cover bonded thereto completely enveloped by a plastic coating 14′ which has been applied as for example by the fluidized bed process. In the fluidized bed process a relatively thick coating of a plastic potting composition, such as epoxy resin, can be readily applied. It envelops the whole circuit board assembly when one simply dips the circuit board into a fluidized bed of plastic in the normal and accepted manner.

Hence, my invention is useful with any of the usual plastic coating techniques, such as the fluidized bed technique, casting, spraying, dipping, and the like. By the term "casting," I mean to include casting in an open mold, e.g. "potting," as well as in a closed mold, e.g. injection molding.

Although this invention has been described in connection with certain specific examples thereof, no limitation is intended thereby except as defined in the appended claims.

I claim:

1. A hybrid integrated microcircuit assembly comprising a circuit board, at least one semiconductive element metallurgically bonded to a surface of said board, a circuit pattern on said surface of said board, at least one filamentary terminal lead interconnecting said element and said circuit pattern, a ceramic cover member for said semiconductive element bonded to said board surface surrounding and enclosing said semiconductive element and said interconnecting filamentary terminal lead, and a plastic coating enveloping said cover and the balance of said board surface.

2. The hybrid integrated microcircuit assembly as defined in claim 1 wherein the circuit board is of a ceramic having expansion characteristics similar to that of the cover member.

3. The hybrid integrated microcircuit assembly as defined in claim 2 wherein said cover member encloses more than one semiconductive element and associated filamentary terminal leads.

4. The hybrid integrated microcircuit assembly as defined in claim 2 wherein the circuit board and the cover member are of alumina, the circuit pattern is of a cermet composition and the ceramic cover member is cemented to the surface of the circuit board over the circuit pattern thereon with a nonconductive cement.

5. The hybrid integrated microcircuit assembly as defined in claim 4 in which the plastic coating enveloping the cover member and the board surface has been cast in place.

6. The hybrid integrated microcircuit assembly as defined in claim 2 wherein the ceramic of the circuit board and of the cover member is alumina.

References Cited

UNITED STATES PATENTS

| | | |
|---|---|---|
| 3,335,328 | 8/1967 | Brackett. |
| 3,386,009 | 5/1968 | Crabbe. |

OTHER REFERENCES

Farrell et al.: "Protective Coating for Devices or Encapsulated Modules," pub. IBM Technical Disclosure Bulletin, vol. 8, No. 12, May 1966, p. 1705.

DARRELL L. CLAY, Primary Examiner

U.S. Cl. X.R.

29—627; 174—52, 68.5; 264—272